INVENTOR.
WALDEMAR HARTWICH
BY
AGENT

INVENTOR.
WALDEMAR HARTWICH
BY
[signature]
AGENT

United States Patent Office 3,493,673
Patented Feb. 3, 1970

3,493,673

ARRANGEMENT FOR PRODUCING TEST SIGNALS FOR A COLOUR TELEVISION SYSTEM

Waldemar Hartwich, Hamburg, Germany, assignor, by mesne assignments, to U.S. Philips Corporation, New York, N.Y., a corporation of Delaware Filed Oct. 27, 1966, Ser. No. 590,052
Claims priority, application Germany, Nov. 25, 1965, P 38,190
Int. Cl. H04n 5/44
U.S. Cl. 178—5.4 3 Claims

ABSTRACT OF THE DISCLOSURE

A test signal generator for color television receivers has two oscillators for producing oscillations of frequencies equal to the sum and difference of the color subcarrier frequency and the line scanning frequency. The mixing product of the oscillators is divided to produce scanning synchronization signals. The output of either of the oscillators is useful as a rainbow signal for NTSC receivers. The outputs of the two oscillators can also be gated at the line frequency to provide rainbow signals for PAL receivers. This abstract is not a measure of the scope of the following disclosure and claims.

This invention relates to arrangements for producing test signals for colour television system, comprising an oscillator which produces a signal $U_{f1}$ of a frequency $f_1=f_{cs}-f_H$, where $f_{cs}$ and $f_H$ are the colour subcarrier frequency and the line frequency respectively.

Arrangements of this kind, so-called rainbow generators, for producing signals according to the NTSC-colour television system are known. This rainbow generator utilizes an oscillator which produces a signal $f_1$ which value is equal to the difference value $f_{cs}-f_H$ or the sum value $f_{cs}+f_H$, where $f_{cs}$ is the colour subcarrier frequency and $f_H$ is the line frequency. It is thus achieved that after synchronous demodulation by means of the colour subcarrier in the colour television receiver according to the NTSC-system which is to be tested, the phase of the test colour signal varies by 360° during one line period so that a picture with the colours of a rainbow appears on the screen of the receiver. Rainbow generators of known type include, in addition, a separate oscillator of signal frequency $12f_H$ for producing, after several divisions, synchronising pulses for the receiver to be tested.

An essential difference with respect to the NTSC-system is that in the PAL-system a test signal must become available the phase of which alternately varies from line to line in opposite directions in a line period.

An object of the invention is to provide a method permitting the principle of the known rainbow generator according to the NTSC-colour television system to be used also for producing test signals according to the PAL-colour television system.

To this end, the arrangement according to the invention is characterized in that for producing a test signal according to the PAL-colour television system it includes a second oscillator which produces a signal $Uf_2$ of a frequency $f_2=f_{cs}+f_H$ and that the output signals $Uf_1$, $Uf_2$ from the two oscillators are led to a mixing stage for obtaining synchronising pulses for the receiver as well as the receiver through an electron switch operating at the line frequency and controlled by the said synchronising pulses.

An additional advantage of the arrangement according to the invention is that the aforementioned separate oscillator for producing synchronising pulses may be dispensed with so that the number of oscillators for both types of rainbow generator (NTSC or PAL) remains the same.

In order to permit the colour subcarrier, the so-called burst signal, which is transmitted for synchronizing purposes during part of the blanking together with the test signal to be phase shifted from line to line with respect to the signals $Uf_1$ and $Uf_2$ produced by the oscillators, a further embodiment of the arrangement according to the invention is characterized in that a phase-shifting device is arranged between the mixing stage and the synchronising pulse producer, and the phase-shifed signal provided by the divider stage for the line frequency synchronising signal is fed to both the electron switch and a gate circuit which provides the colour subcarrier (burst) during part of the blanking.

As is well-known, in the PAL new-new system it is necessary to transmit, together with the colour signal, a modified colour synchronsing signal (burst signal) the phase of which changes from line to line about the so-called $-(B-Y)$ phase. From this modified colour synchronising signal the identification of the colour (control of the position of the electron switch) in the receiver may take place.

With this further embodiment it is readily possible to make the rainbow generator also produce the said modified colour synchronising signal.

In order that the invention may be readily carried into effect, it will now be described in detail, by way of example, with reference to the accompanying diagrammatic drawings, in which.

Figure 1:
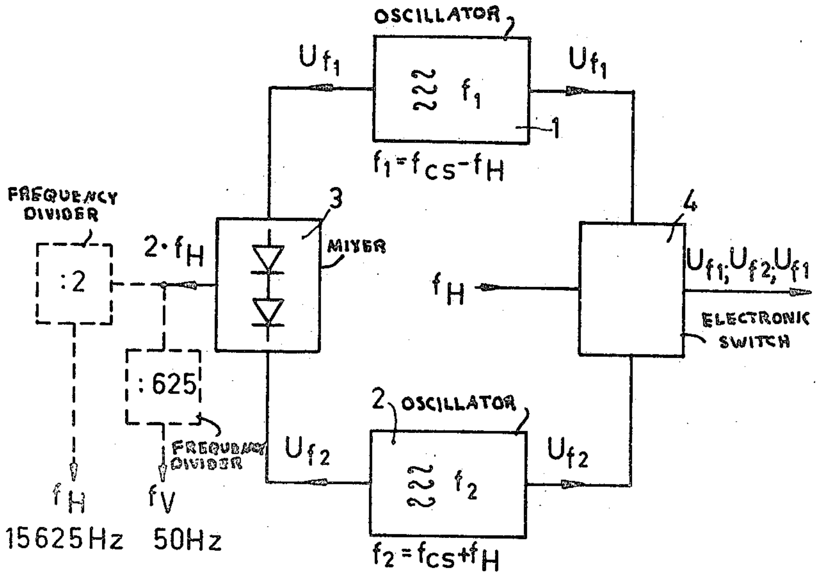
FIGURE 1 shows in block diagram the principle of the invention.

In FIGURE 1 an oscillator 1 produces a signal $Uf_1$ of frequency $f_1=f_{cs}-f_H$ where $f_{cs}$ is the colour subcarrier frequency and $f_H$ is the line frequency. According to one step of the invention, the arrangement also includes a second oscillator 2 which produces a signal $Uf_2$ of frequency $f_2=f_{cs}+f_H$. It will be evident that the frequencies of the oscillators 1 and 2 may be relatively exchanged and that the oscillators may be in the form of, for example, quartz oscillators. Test colour signals $Uf_1$ and $Uf_2$ are available on the outputs of the oscillators 1 and 2. According to a further step of the invention the said signals are fed, on the one hand, to a mixing stage 3 and on the other, to an electron switch 4. At the output of mixing stage 3 there now appears a signal of double the line frequency which, after suitable divisions, provides signals of the line frequency $f_H=15,625$ c./s. and the field frequency $f_V=50$ c./s. It will be evident that for other television systems (insofar the numbers of lines and fields are concerned) other frequencies may be chosen for $f_H$ and $f_V$.

By means of mixing stage 3 a constant relationship is obtained between the difference frequency of the oscillators of frequencies $f_1$, $f_2$ and the line frequency $f_H$ so that good synchronisation of the signals on the screen of the receiver to be tested, i.e. good colour constancy, is ensured at all times. Furthermore, the line frequency $f_H$ serves to control the electron switch 4 which switches the test signals $Uf_1$ and $Uf_2$ from the oscillators 1 and 2 in the rhythm of the line frequency to deliver the same to the receiver. This results in the colour test signal required for the PAL-colour television system and which has a phase which varies from line to line in opposite directions, that is to say by 360° during one line period.

Figure 2:
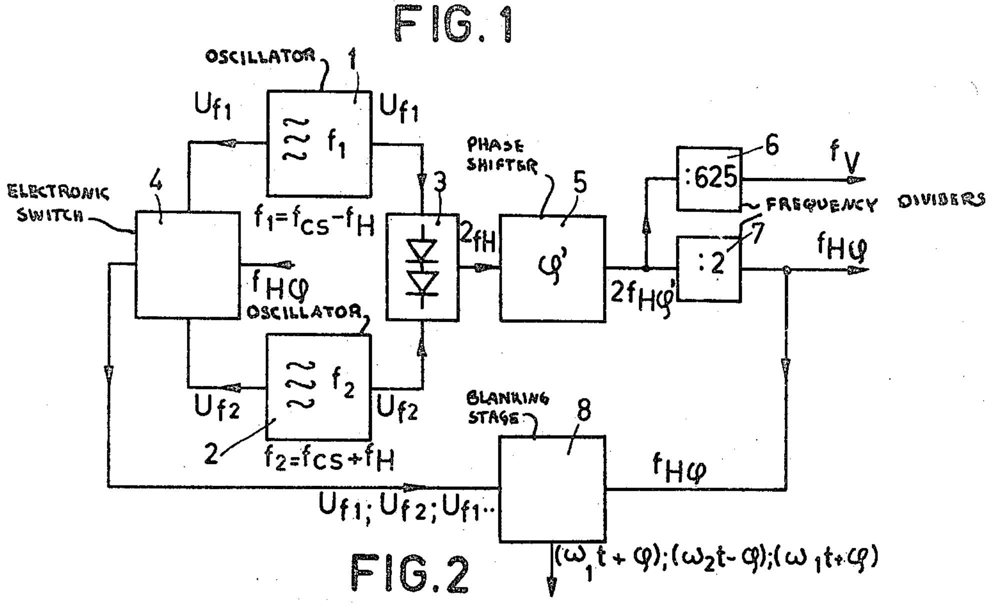
FIGURE 2 shows in block diagram a further elaboration thereof.

The blocks already numbered in FIGURE 1 are provided with the same reference numerals in FIGURE 2. However, the ouptut of mixing stage 3 is now connected to a phase-shifting device 5 so that the signal of double the line frequency undergoes a phase shift of $\varphi'$. This is to generate a burst signal having a phase shift between successive lines. This phase-shifted signal of double the line frequency $$(2f_{H\varphi'})$$

provides through a divider 6 a signal of field frequency $f_v$ and through a divider 7 a phase-shifted signal of the line frequency $$(f_{H\varphi})$$

This signal $$(f_{H\varphi})$$

is fed to both the electron switch 4 and a blanking stage 8 which latter also receives the signals $U_{f1}$, $U_{f2}$, $U_{f1}$, . . . switched by the electron switch 4.

The colour subcarrier (burst) obtained in known manner in the blanking stage 8 is thus shifted in phase by an angle $\varphi$.

Figure 3:
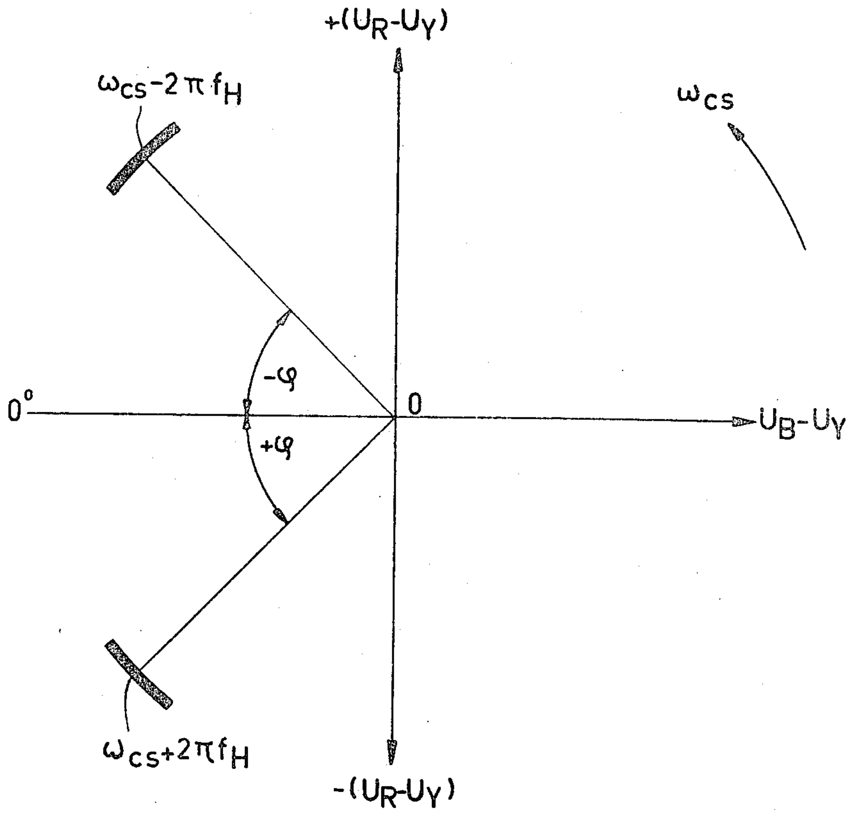
FIGURE 3 shows a vector diagram to clarify the operation of the arrangement of FIGURE 2.

The operation of the arrangement of FIGURE 2 may readily be appreciated with reference to FIGURE 3. The colour subcarrier (burst) used during blanking for two sequential lines of a field has a radian frequency $$\omega_1 = \omega_{cs} - 2\pi f_H$$

for one line and a radian frequency $\omega_2 = \omega_{cs} + 2\pi f_H$ for the other line, the burst in the $(U_R - U_Y)$, $(U_B - U_Y)$ plane being shifted through an angle $-\varphi$ in the first case and through an angle $+\varphi$ in the second case by the phase-shifting device 5. Dependent upon the sign of the angle $\varphi$, in the receiver according to the PAL-system identification signals are produced for determining the sense in which the phase of the test colour signal varies during one line period.

It will be evident that the colour test signal obtained on the principle of the invention can be used in various ways. By means of mixing stages and a modulator it is possible, for example, to obtain a colour test signal which may be fed to the aerial terminals of a colour television receiver to be tested.

What is claimed is:

1. A test signal generator for colour television receivers comprising first and second oscillators for producing first and second oscillations respectively of frequencies equal to the sum and difference respectively of the color subcarrier frequency and the line scanning frequency, whereby the output of either of said oscillators is suitable as a rainbow signal for NTSC type receivers, means for mixing said first and second oscillations to produce a signal of twice said line scanning frequency, means for dividing said last mentioned signal to produce line and field synchronizing signals, a switch circuit, and means for alternately applying said first and second oscillations to said switch circuit at the rate of said line frequency to produce rainbow signals for PAL type receivers.

2. A test generator as in claim 1 further comprising a phase shifter coupled between said mixing means and said dividing means and a blanking stage means coupled to said line synchronizing signals and said switch circuit.

3. A test generator as in claim 1 wherein said dividing means comprises a first and second frequency divider means for producing said line and field synchronizing signals.

References Cited

UNITED STATES PATENTS 2,975,229 3/1961 Wlasuk ------------ 178—5.4

ROBERT L. GRIFFIN, Primary Examiner

J. C. MARTIN, Assistant Examiner